(12) United States Patent
Schmid

(10) Patent No.: US 12,240,368 B2
(45) Date of Patent: Mar. 4, 2025

(54) STORAGE COMPARTMENT WITH AN ELASTIC COMPARTMENT DIVIDER

(71) Applicant: Bayerische Motoren Werke Aktiengesellschaft, Munich (DE)

(72) Inventor: Bernhard Schmid, Hallbergmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 566 days.

(21) Appl. No.: 17/436,924

(22) PCT Filed: Feb. 6, 2020

(86) PCT No.: PCT/EP2020/053039
§ 371 (c)(1),
(2) Date: Sep. 7, 2021

(87) PCT Pub. No.: WO2020/182382
PCT Pub. Date: Sep. 17, 2020

(65) Prior Publication Data
US 2022/0153178 A1 May 19, 2022

(30) Foreign Application Priority Data

Mar. 12, 2019 (DE) ................ 10 2019 106 311.6

(51) Int. Cl.
*B60N 3/10* (2006.01)
*B60R 7/04* (2006.01)

(52) U.S. Cl.
CPC ............ *B60N 3/108* (2013.01); *B60R 7/04* (2013.01)

(58) Field of Classification Search
CPC .................... B60R 7/04; B60N 3/108
See application file for complete search history.

(56) References Cited

U.S. PATENT DOCUMENTS

2003/0094557 A1* 5/2003 Takahashi .......... B60N 2/02246
248/550
2003/0155477 A1* 8/2003 Schaal ................ B60N 3/106
248/311.2

(Continued)

FOREIGN PATENT DOCUMENTS

CN 203410372 U 1/2014
CN 106114385 A 11/2016

(Continued)

OTHER PUBLICATIONS

International Search Report (PCT/ISA/210) issued in PCT Application No. PCT/EP2020/053039 dated May 18, 2020 with English translation (five (5) pages).

(Continued)

*Primary Examiner* — Derek J Battisti
(74) *Attorney, Agent, or Firm* — Crowell & Moring LLP

(57) ABSTRACT

A storage compartment for installation in a motor vehicle includes a storage volume which is bounded laterally by an at least partially encircling storage wall. At least one elastic compartment divider, which has a macroscopically elastic material at least in a central region of a longitudinal extent of the compartment divider, is provided such that the compartment divider can be transferred between a first divider position and a second divider position and which, at the first divider position, divides the storage volume into a first partial compartment and a second partial compartment and, at the second divider position, forms part of the storage wall of the storage volume. Two spaced-apart divider receptacles are arranged on the storage wall and at which in each case one of two longitudinal ends of the compartment divider is accommodated. The compartment divider is mounted on each of the divider receptacles so as to be rotatable about a divider longitudinal axis.

14 Claims, 3 Drawing Sheets

(56) References Cited

U.S. PATENT DOCUMENTS

| | | | | |
|---|---|---|---|---|
| 2006/0237611 | A1* | 10/2006 | Sturt | B60N 3/106 248/311.2 |
| 2011/0074173 | A1* | 3/2011 | Gaudig | B60N 3/108 296/24.34 |
| 2012/0091744 | A1* | 4/2012 | McKnight | B60R 11/00 296/24.34 |
| 2013/0187400 | A1* | 7/2013 | D.Alessandro | B60R 7/04 29/428 |
| 2013/0214549 | A1 | 8/2013 | Gaudig et al. | |
| 2015/0001363 | A1* | 1/2015 | Bohlke | B60N 3/106 248/311.2 |
| 2016/0325688 | A1* | 11/2016 | Dyle | B60R 7/04 |

FOREIGN PATENT DOCUMENTS

| | | |
|---|---|---|
| DE | 10 2006 018 895 A1 | 11/2006 |
| DE | 10 2007 006 575 A1 | 8/2008 |
| DE | 10 2009 000 972 A1 | 8/2010 |
| DE | 10 2009 043 768 A1 | 3/2011 |
| DE | 10 2009 043 771 A1 | 3/2011 |
| DE | 10 2010 025 624 A1 | 1/2012 |
| DE | 10 2012 020 976 A1 | 4/2014 |
| DE | 10 2014 016 230 A1 | 4/2016 |
| EP | 1 028 023 A2 | 8/2000 |
| GB | 2474138 A | 4/2011 |
| JP | 2001-171416 A | 6/2001 |

OTHER PUBLICATIONS

German-language Written Opinion (PCT/ISA/237) issued in PCT Application No. PCT/EP2020/053039 dated May 18, 2020 (five (5) pages).

German-language Search Report issued in German Application No. 10 2019 106 311.6 dated Dec. 2, 2019 with a partial English translation (14 pages).

English translation of Chinese Office Action issued in Chinese Application No. 202080019556.9 dated Dec. 1, 2022 (10 pages).

* cited by examiner

FIG. 3
a)
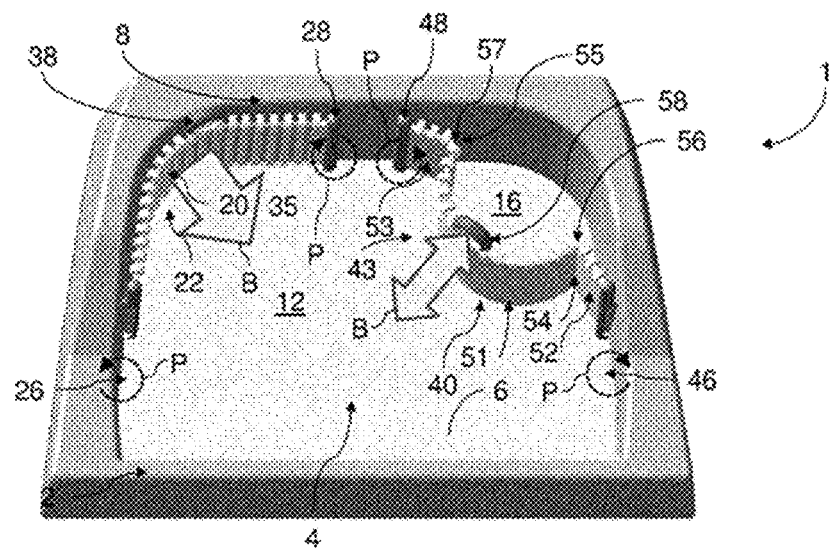
b)
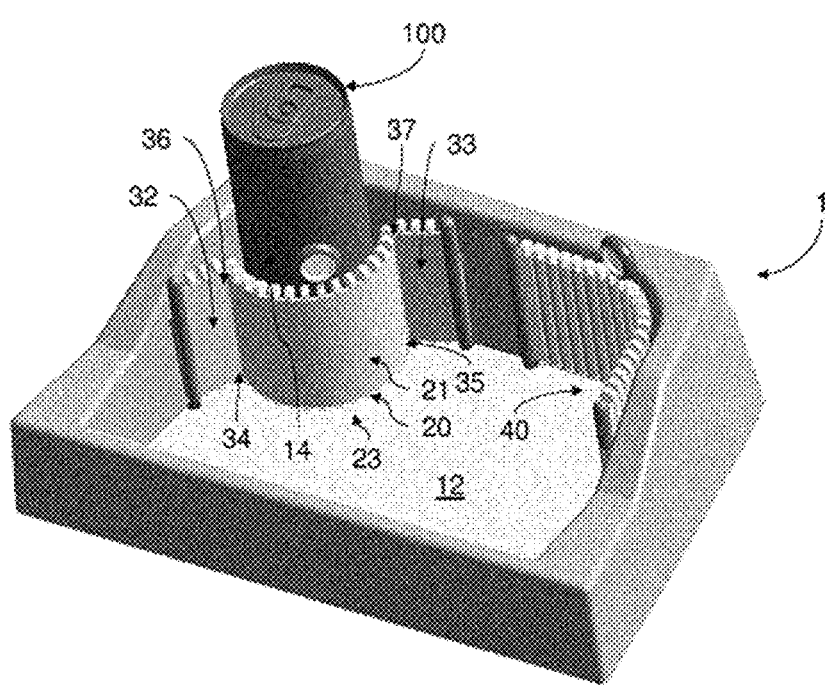

STORAGE COMPARTMENT WITH AN ELASTIC COMPARTMENT DIVIDER

BACKGROUND AND SUMMARY OF THE INVENTION

The invention relates to a storage compartment for installation in a motor vehicle.

In motor vehicles—for example in the region of the central console—storage compartments are arranged, which are used for storing pens, documents, spectacles, telephones, and the like.

On account of the need for a high degree of utilization of structural space, these storage compartments are regularly formed with a pronounced transverse and/or longitudinal extent, in order also to be able to receive elongate objects horizontally.

In particular if no separate beverage holders are provided in the motor vehicle, storage compartments of this type are however also used by the occupants of the vehicle to place bottles, beverage cans, cups, glasses, or the like. On account of the pronounced transverse and/or longitudinal extent of the storage means, a retention of beverage containers of this type that is secure in terms of tipping over is, however, not ensured in any event.

For this purpose, DE 10 2007 006 575 A1 proposes a receptacle for the retention of objects with different base-area dimensions that is secure in terms of tipping over, wherein the receptacle has a bottom surface and side walls which together form a receiving compartment. Provided for the purpose of retention that is secure in terms of tipping over is a compartment divider, which is mounted pivotably on a side wall and subjected to a spring force, and via which the objects set down in the receiving compartment are pressed against at least one side wall of the receptacle. However, this solution requires many components and is cumbersome to assemble.

DE 10 2006 018 895 A1 proposes a storage compartment/cup holder arrangement with a cast base, into which a pair of elastic, reversible dividers can be inserted, which should allow the secure retention of beverage cups of different sizes. The elastic, reversible dividers can be inserted and placed under tension by an internal spring of the elastic divider. This solution does not require any separate spring mechanism. However, the storage compartment is subdivided in different ways—but subdivided nevertheless—in the two possible positions of the reversible divider. This makes storage of larger objects in the storage compartment more difficult.

Nowadays, installed in vehicles produced by the Applicant and in vehicles produced by competitors are storage compartments which have at least one elastic compartment divider, which can be transferred between a first divider position and a second divider position, in particular by means of an operating force. In the first divider position, the compartment divider subdivides the storage volume into a first subcompartment and a second subcompartment. This makes it possible for the first, smaller subcompartment to be separated from the larger storage volume by means of the compartment divider, with the result that a beverage container, for example, can be retained in the first subcompartment in a manner secure in terms of tipping over.

If the compartment divider is transferred into the second divider position, at the second divider position the compartment divider forms a part of the storage wall of the storage volume, with the result that at the second divider position the storage volume is in particular at least substantially undivided. In this way, at least substantially the storage volume as a whole is available for the storage of relatively large objects, without the compartment divider significantly reducing the size of the volume provided.

However, in the case of these storage compartments, it is difficult for the user to retain beverage containers of different sizes in the first subcompartment in a manner secure in terms of tipping over.

Against this background, an object of the invention is to improve a storage compartment for installation in a motor vehicle.

This object is achieved by a storage compartment having the features of the independent claim. The dependent claims focus attention on advantageous developments of the invention.

According to one aspect of the invention, a storage compartment for installation in a motor vehicle, in particular in a (central) console of a motor vehicle, is provided.

The storage compartment has a storage volume, which is laterally delimited by an at least partially peripheral storage wall. In particular, the storage volume is delimited at the top (that is to say, at its boundary arranged vertically at the top) by a storage opening and, if appropriate, protrusions of a cover for the console, wherein the storage opening can be formed for example by a suitably configured opening in a cover of the storage compartment and/or by the (respective) top edge(s) of the storage wall. The storage volume may additionally, if appropriate, be delimited at the bottom (that is to say, at its boundary arranged horizontally at the bottom) at least partially by a storage bottom.

In addition, the storage compartment has at least one elastic compartment divider, which comprises a macroscopically elastic material at least in a central region of a longitudinal extent of the compartment divider, with the result that the compartment divider can be transferred between a first divider position and a second divider position, and which at the first divider position subdivides the storage volume into a first subcompartment and a second subcompartment, and at the second divider position forms a part of the storage wall of the storage volume.

Furthermore, the storage compartment has two divider receptacles which are spaced apart from one another, are arranged on the storage wall and on which a respective one of two longitudinal ends of the compartment divider is received, wherein the compartment divider on each of the divider receptacles is mounted rotatably about a divider axis of rotation which is perpendicular to a connecting axis between the divider receptacles.

Arranged on each of the divider receptacles is a positioning device, which is configured to transfer the compartment divider into the second divider position by means of a positioning force, in particular proceeding from the first divider position or another divider position that lies between the first and second divider positions, and/or to retain the compartment divider at the second divider position.

The invention is based on the consideration, inter alia, of designing a storage compartment which has a mechanism that is as simple as possible and which provides both a maximum storage volume which is as large as possible and a suitable cup holder for beverage containers of various sizes, such as for example a can for an energy drink on the one hand (e.g. 250 ml) and a large water bottle (e.g. 1.5 l) on the other hand.

The invention is now based on the idea, inter alia, of utilizing the properties of an elongate elastic component clamped in between two guide points in such a way that the rest position on one side of the dead center allows a division of a cup holder within the storage volume, while the rest position on the other side of the dead center is arranged outside or on the edge of the storage volume.

According to one embodiment, the operating force required to transfer the compartment divider between the first divider position and the second divider position, or vice versa, can be applied manually—for example at an operating lug—by a user. According to another embodiment, an electromotive transfer can also be provided, which can then be suitably triggered by the user.

In addition, the invention is based on the idea, inter alia, of firstly stretching the base area partitioned by the compartment divider toward the second divider position by way of a predefined positioning force to the extent that the beverage container can be introduced. Then, the base area is reduced in size by way of the predefined positioning force to the extent that the compartment divider bears against the beverage container. Furthermore: the predefined positioning force makes it possible, if appropriate, to press the beverage container against the storage wall and thus retain it in a manner secure in terms of tipping over.

In order to provide a solution for the positioning device that is as robust as possible and, in the process, in particular also cost-effective and simple, according to one embodiment the positioning device has a spring, which is pretensioned in such a way that it can transfer the compartment divider into the second divider position by means of a spring force and/or can retain the compartment divider at the second divider position. In particular, the spring force thus acts in such a way that the spring force presses and/or draws a compartment divider deflected by the storage wall back again against the storage wall and—once the compartment divider arrives there—retains it.

According to one embodiment, the compartment divider has a central, elastic region and a respective receiving region laterally on either side of this central region with respect to the longitudinal extent of the compartment divider. The compartment divider is respectively received in one of the divider receptacles on the longitudinal end of the respective receiving region, that is to say in particular with respect to the longitudinal extent of the compartment divider. According to one embodiment, in this respect the receiving regions have a macroscopically rigid form. As a result, the central region "encompasses" or "nestles against" a received beverage container more easily—and in this way a contact surface between the beverage container and the compartment divider is enlarged. Therefore, with different container diameters, a better securement in terms of tipping over can be achieved, because the positioning force acts.

According to one embodiment, a respective bending axis, which is aligned in particular parallel to the divider axes of rotation, is provided between the central region and each of the receiving regions of the compartment divider. In particular, such a bending axis can be formed by means of a smaller material cross section than the surrounding regions and/or by means of a respective rotary joint, which is arranged on the bending axis. In this way, it can additionally be made easier for the central region to "encompass" or "nestle against" a received beverage container.

According to one embodiment, as a result of a deflection of the central region about the bending axes, the compartment divider can be transferred from the second divider position into a third divider position, in which the central region subdivides the storage volume into a third subcompartment and a fourth subcompartment, wherein in particular the third subcompartment is larger than the first subcompartment and the fourth subcompartment is smaller than the second subcompartment. In other words: if the compartment divider firstly bears against the storage wall (corresponding to the second divider position), the central region can be deflected away from the storage wall, while the receiving regions remain bearing against the storage wall, because the positioning force continues to act. The deflection is effected accordingly about the bending axes of the compartment divider firstly into the third divider position. Then, the compartment divider can be transferred into the first divider position by means of an operating force of the user, wherein the positioning force has to be overcome in order to deflect the receiving regions.

According to one embodiment, the compartment divider can be transferred from the first divider position into the third divider position in the "other direction" by deflecting the receiving regions about the bending axes. This is because here the positioning force counteracts the complete deflection of the receiving regions about the divider axis of rotation. The receiving elements are drawn or pressed toward the storage wall again. The central region of the compartment divider firstly remains in the third divider position and can then be transferred into the second divider position by means of an operating force of the user.

According to different embodiments, the compartment divider can have a larger or smaller vertical extent (corresponding in particular to the extent along a divider axis of rotation). The compartment divider can thus have a round or oval cross section which runs in particular horizontally, for example. In another embodiment, the compartment divider can have the shape of a thin wall.

In any case, the compartment divider comprises a macroscopically elastic material, in particular an elastic polymer material and/or metal material, which is suitable in particular for installation in an interior space of a motor vehicle.

According to one embodiment, the elasticity of the compartment divider results at least substantially from the use of a macroscopically elastic material, in particular a polymer material (e.g. a suitable elastomer) and/or a metal material (e.g. a flat spring-steel tape, as in the case of known domestic measuring tapes), at least on a part of the longitudinal extent or the entire longitudinal extent of the compartment divider, with the result that in this way the compartment divider can be transferred between the first divider position and the second divider position. In particular, the elastic polymer is arranged at least in a central region of the longitudinal extent of the compartment divider.

According to one embodiment, in order to retain the container to be retained in its position in a fixed and rattle-free manner, at least one protrusion, in particular a plurality of protrusions, in particular nubs and/or pads, are arranged in a region in which the compartment divider comprises the macroscopically elastic material and on a side facing the container to be retained.

According to one embodiment, in order to define the dead center of the transfer of the compartment divider between the first divider position and the second divider position, two divider receptacles which are spaced apart from one another and on which a respective one of two longitudinal ends of the compartment divider is received are arranged on the storage wall.

In particular, the positioning of the divider receptacles also makes it possible to ensure that the compartment divider in the second divider position forms a part of the storage wall. In particular, the compartment receptacles may also form a part of the storage wall.

For example, a divider receptacle may have a rotary hinge, the axis of rotation of which runs along a divider axis of rotation. According to one embodiment, for this purpose the compartment divider is mounted on each of the divider receptacles rotatably about a divider axis of rotation which is perpendicular to a connecting axis between the divider receptacles, in particular the dead-center axis.

According to one embodiment, the divider axis of rotation runs at least substantially parallel to a plane of extent of the storage wall, in order to support a simple transfer of the compartment divider between the first and the second divider position.

According to one embodiment, in particular in order that round beverage containers can be retained in a manner secure in terms of tipping over, that part of the storage wall which is formed by the compartment divider has an at least substantially constant curvature, such that this part of the storage wall has an at least substantially constant radius.

According to one embodiment, in order to further improve the securement in terms of tipping over, the compartment divider at the first divider position and the storage wall in the region of the compartment divider, which is not arranged at the second divider position, at least in a partial region are arranged symmetrically with respect to a connecting axis between the divider receptacles. In particular, in this respect the symmetrical partial region describes a partial circle and/or a partial ellipse about a point on the connecting axis.

According to one embodiment, in order to be able to receive objects with various forms in the storage compartment, in particular in order to be able to receive round and square beverage containers, for example, the storage compartment on the far side of the compartment divider has a prismatic, in particular a rectangular, basic shape and/or the compartment divider is arranged on one corner of the basic shape.

According to one embodiment, in order to be able to receive at least two beverage containers in the storage compartment, two compartment dividers which are spaced apart from one another are provided. In particular, the two compartment dividers are formed mirror-symmetrically with respect to a center longitudinal axis of the storage compartment. The storage compartment is thus suitable, for example, for installation in a central console of a motor vehicle, wherein in that case for example a respective compartment divider can be assigned to a driver's seat and/or the passenger seat.

Further advantages and application possibilities of the invention will emerge from the following description in conjunction with the figures.

BRIEF DESCRIPTION OF THE DRAWINGS

FIG. 3a shows an oblique view of a storage compartment with two compartment dividers according to a further exemplary embodiment of the invention in a first operating state.

FIG. 3b shows the storage compartment from FIG. 3a in a second operating state.

DETAILED DESCRIPTION OF THE DRAWINGS

Figure 1:
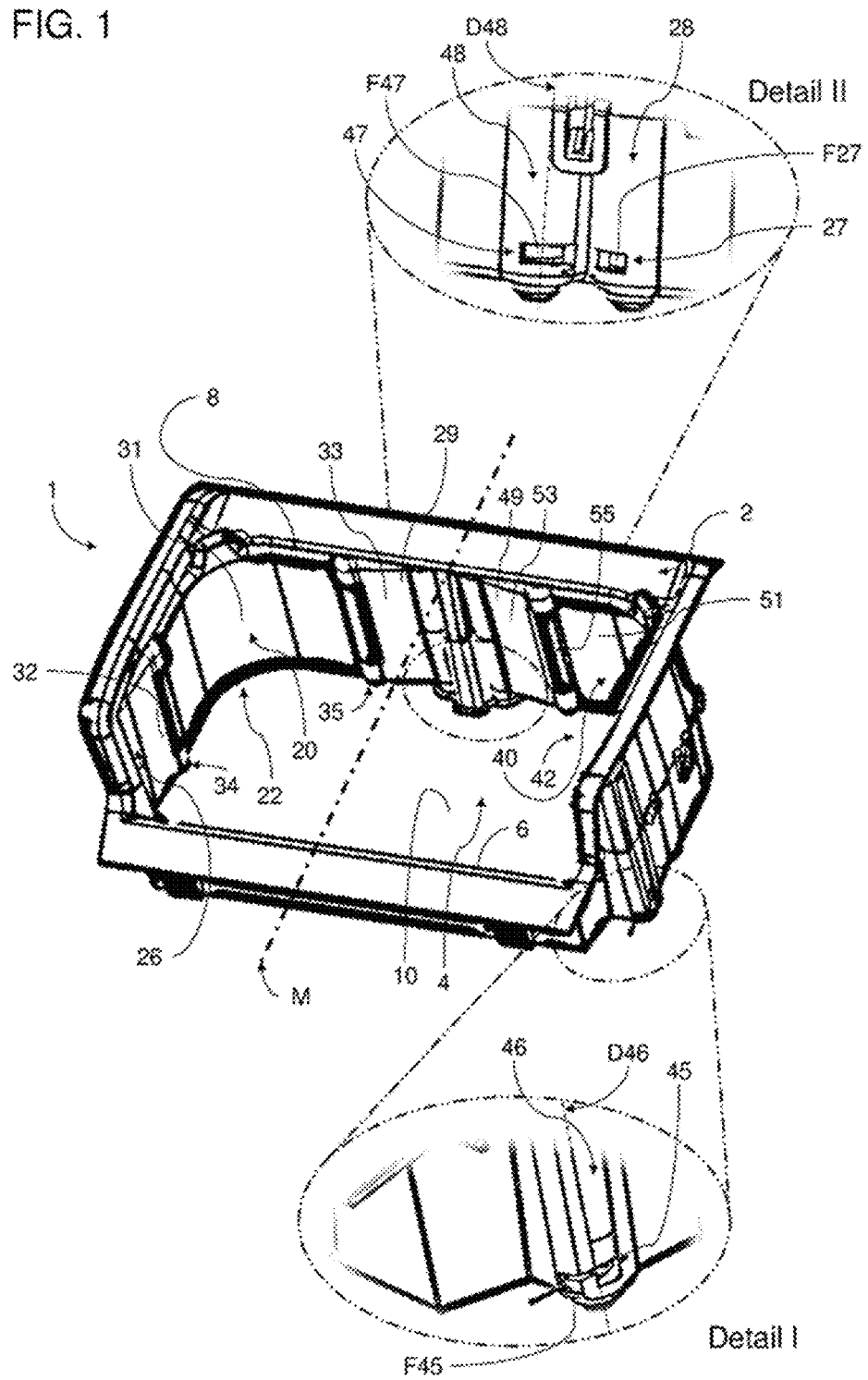
FIG. 1 shows a perspective oblique view of a storage compartment with two compartment dividers according to an exemplary embodiment of the invention in a first operating state.

FIG. 1 shows a storage compartment 1, which is installed in a console 2 of an motor vehicle, which is otherwise not illustrated. In the exemplary embodiment, the console is a central console between a driver's seat and a passenger seat.

The storage compartment 1 has a storage volume 4, which is delimited laterally by a storage wall 6. Toward the rest of the vehicle interior (that is to say at least substantially upward), the storage volume 4 is delimited by a storage opening 8. In the exemplary embodiment, the boundary of the storage opening 8 is formed in partial regions of the storage wall 6 as an upper edge of this storage wall, in other partial regions by protrusions of a console cover that engage in a perpendicular projection of the storage wall 6.

In this case, the storage opening 8 has a rectangular basic form, wherein respective partially circular roundings are arranged on the rear two corners of the rectangle.

In the region of the partially circular roundings, the storage compartment 1 has two elastic compartment dividers 20 and 40, which are spaced apart from one another mirror-symmetrically with respect to a center longitudinal axis M of the storage compartment 1 or the storage volume 4. The storage compartment 1 is thus formed symmetrically with respect to the center longitudinal axis M.

In the illustration of FIG. 1, the two compartment dividers 20 and 40 are arranged at a second divider position 22 and 42, respectively, and thus at the boundary of the storage volume 4. The compartment divider 20 forms a part 29 of the storage wall 6; the compartment divider 40 forms a part 49 (not illustrated in FIG. 1; see FIG. 2) of the storage wall 6.

The compartment dividers 20, 40 have a respective central region 31, 51, in which the compartment divider 20, 40 comprises a macroscopically elastic material. With respect to the longitudinal extent thereof, each of the compartment dividers 20, 40 has a respective receiving region 32 and 33, and 52 and 53, respectively on either side laterally with respect to the central region 31, 51. The receiving regions 32, 33, 52, 53 have a macroscopically rigid form in the exemplary embodiment.

For each compartment divider 20, 40, the storage compartment 1 has two divider receptacles 26 and 28, and 46 and 48, respectively, which are spaced apart from one another, are arranged on the storage wall 6 and on which a respective one of two longitudinal ends of the compartment divider 20, 40 is received. The respective compartment divider 20 and 40 is mounted on the assigned divider receptacles 26 and 28, and 46 and 48, respectively, rotatably about a divider axis of rotation D which is perpendicular to a connecting axis between the divider receptacles.

As can be gathered in particular from the details I and II in FIG. 1 (detail II shows the marked portion from the rear, that is to say from the side which is not visible per se in FIG. 1), arranged on each of the divider receptacles 26, 28, 46, 48 is a respective positioning device 25, 27, 45, 47, which is configured to transfer the respective compartment divider 20, 40 into the second divider position 22, 42 by means of a positioning force P, or retain it in this position. In the exemplary embodiment, the positioning device has a respective spring F25, F27, F45, F47, which is pretensioned in such a way that it can transfer the compartment divider 20 and 40, respectively, into the second divider position by means of a spring force or retain it there. In particular, the spring force thus acts in such a way that a compartment divider 20, 40 deflected by the storage wall 6 is pressed and/or drawn back again against the storage wall 6 by means of the assigned springs F25, F27 and F45, F47, respectively, and is retained once it arrives there.

Provided between the central region 31, 51 and each of the receiving regions 32 and 33, and 52 and 53, respectively, of the compartment divider 20, 40 is a respective bending axis 34, 35 and 54, 55, respectively, which is aligned in particular parallel to the divider axes of rotation D. In the exemplary embodiment, the bending axes 34, 35 and 54, 55 are respectively formed by axes of rotation 36, 37 and 56, 57, respectively, which are arranged on the respective bending axis.

Figure 2:
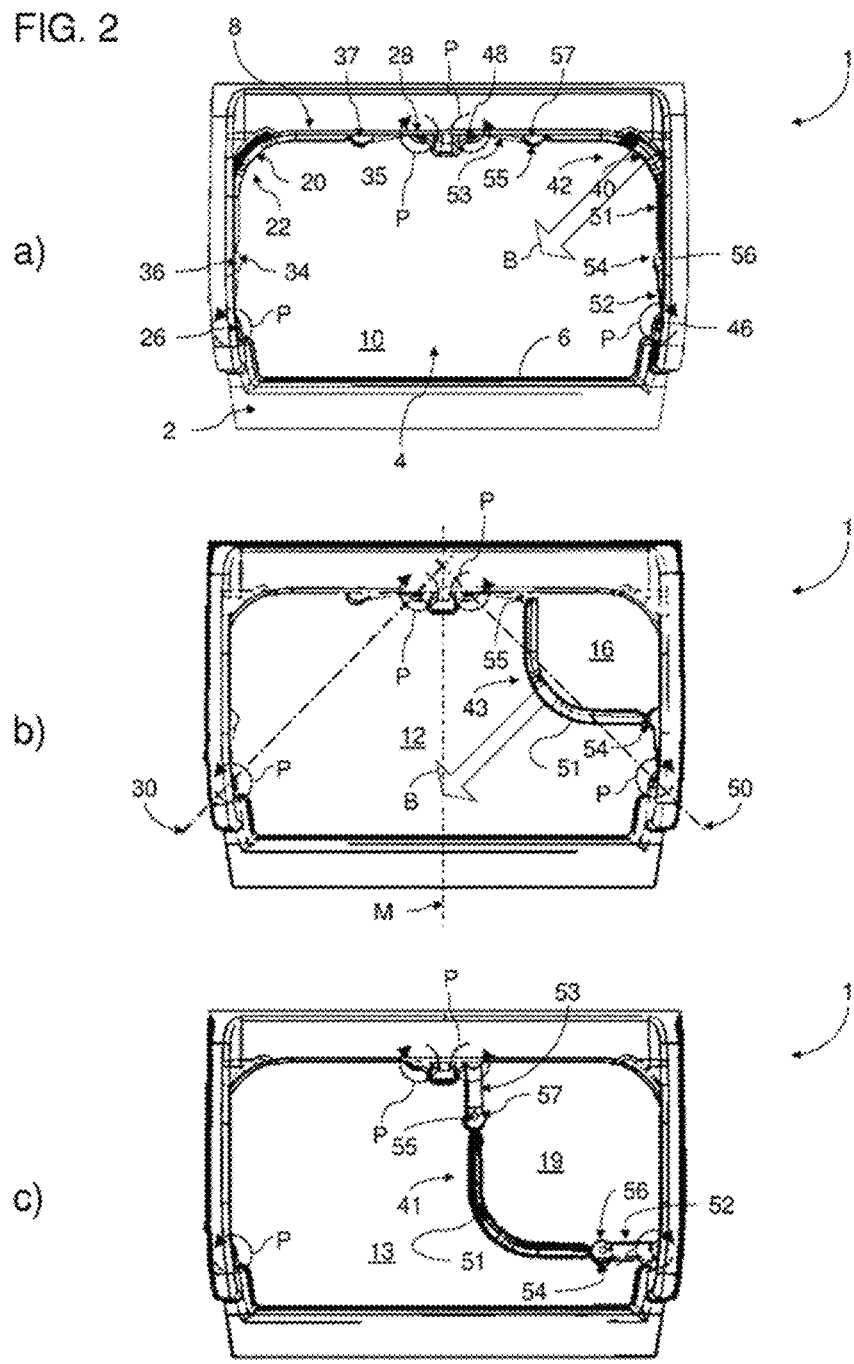
FIGS. 2a-2c show a plan view of the storage compartment from FIG. 1 in the first operating state (FIG. 2a), in a second operating state (FIG. 2b), and in a third operating state (FIG. 3c).

FIG. 2 explains, in relation to the storage compartment 1 of FIG. 1, how the two compartment dividers 20 and 40 can be transferred between the second divider position 22 and 42, respectively, and a first divider position 41 and a third divider position 23 and 43, respectively.

The compartment divider 20 is received and mounted on two divider receptacles 26 and 28, on which it is mounted rotatably about a longitudinal axis of the divider receptacles in each case. The compartment divider 40 is received and mounted on two divider receptacles 46 and 48, on which it is mounted rotatably about a longitudinal axis of the divider receptacles in each case.

In FIG. 2a, the two compartment dividers 20 and 40 are arranged at the second divider position 22 and 42, respectively, in which they do not subdivide the storage volume 4 into a first subcompartment 12 and a respective further subcompartment. Rather, the two compartment dividers 20 and 40 bear against the storage wall 6.

In the exemplary embodiment, as a result of a deflection of the central region 31, 51 about the bending axes 34, 35 and 54, 55, respectively, the compartment divider 20, 40 can be transferred from the second divider position 22, 42 into a third divider position 23, 43, in which the central region 31, 51 subdivides the storage volume into a third subcompartment 19 and a fourth subcompartment 13.

As illustrated in FIG. 2a, the compartment divider 40 thus firstly bears against the storage wall 6, this corresponding to the second divider position 42.

Proceeding from this, the central region 51 can be elastically deformed away from the storage wall 6 by means of an operating force B of a user and deflected as a result, while the receiving regions 52, 53 remain bearing against the storage wall 6, because the positioning force P continues to act. The deflection is effected accordingly about the bending axes 54 and 55 of the compartment divider 40 firstly into the third divider position 43. The result is illustrated in FIG. 2b.

Then, the compartment divider can be transferred into the first divider position 41 by means of a further operating force B of the user, wherein the positioning force P has to be overcome in order to deflect the receiving regions 52 and 53. The result is illustrated in FIG. 2c.

The compartment divider 40 can be transferred from the first divider position 41 into the third divider position 43 in the "other direction" by deflecting the receiving regions 52, 53 about the bending axes 54, 55. For example, this transfer into the third divider position 43 can be effected after removing a placed beverage container from the second subcompartment 16 without action by the user by means of the positioning force P alone. This is because the positioning force P counteracts the complete deflection of the receiving regions 52 and 53 about the divider axes of rotation D. The receiving regions are drawn or pressed toward the storage wall 6 again. The central region 51 of the compartment divider 40 firstly remains in the third divider position 43 and can then be transferred into the second divider position 42 by means of an operating force B of the user.

In order to transfer the compartment divider 40 into the first divider position 41, a force B was applied—for example by the passenger—to an operating lug 58, in order to move the compartment divider 40 over the dead center of the elastic deformation (compare dead axis=connecting axis 50 between the divider receptacles 46 and 48). For this purpose, an elastic deformation of the compartment divider 40 is provided. After the dead center is reached, an elastic deformation of the compartment divider 40 toward the position illustrated in FIG. 2b is effected of its own accord.

The same also applies for the first compartment divider 20, which in the illustrations of FIGS. 2a-c, however, is arranged respectively at the second divider position 22.

The divider receptacles 26 and 28, and 46 and 48 are respectively formed with a rotary bearing.

FIGS. 3a and b respectively illustrate the same storage compartment 1, which has a substantially similar form to the storage compartment of FIGS. 1 and 2, in a schematic oblique view.

FIG. 3a illustrates the first compartment divider 20 at the second divider position 22. The arrow here shows the direction of the operating force B required to transfer the compartment divider 20 into the third divider position 23.

The second compartment divider 40 is illustrated at the third divider position 43. The double-headed arrow shows here the possibility on the one hand of transferring the compartment divider 40 into the first divider position 41 by means of an operating force. On the other hand of transferring the compartment divider 40 from there back into the third divider position 43 again by means of the positioning force P.

In FIG. 3b, a small beverage can 100 with a round cross section is arranged in the second subcompartment 14. The beverage can 100 is protected against tipping over since the compartment divider 20 is arranged in the third divider position 23. The positioning force P of the positioning devices 25, 27 is applied to the receiving regions 32 and 33 by means of the springs F25 and F27, with the result that the receiving regions press the macroelastic region 31 of the compartment divider 20 closely against a lateral surface of the beverage can 100 by way of the rotary joints 36 and 37. In this way, the can 100 is additionally pressed against the receptacle wall 6, and therefore the can 100 is retained in a manner secure in terms of tipping over.

LIST OF REFERENCE SIGNS

1 Storage compartment
2 Console
4 Storage volume
6 Storage wall
8 Storage opening
10 Storage bottom
12 First subcompartment
13 Fourth subcompartment
14, 16 Second subcompartment
19 Third subcompartment
20, 40 Elastic compartment divider
41 First divider position
22, 42 Second divider position
23, 43 Third divider position
29, 49 Part of the storage wall
26, 28, 46, 48 Divider receptacles
25, 27, 45, 47 Positioning device, here positioning spring
30, 50 Connecting axis
31, 51 Central region
32, 33, 52, 53 Receiving regions
34, 35, 54, 55 Bending axis
36, 37, 56, 57 Rotary joint
38, 58 Operating lug
100 Beverage can
D Divider axis of rotation B Operating force
M Center longitudinal axis of the storage compartment
P Positioning force, here spring force

What is claimed is:

1. A storage compartment for installation in a motor vehicle, comprising:
    a storage volume, which is laterally delimited by an at least partially peripheral storage wall;
    at least one elastic compartment divider, which comprises a macroscopically elastic material at least in a central region of a longitudinal extent of the compartment divider, whereby the compartment divider is transferable between a first divider position and a second divider position, and which at the first divider position subdivides the storage volume into a first subcompartment and a second subcompartment, and at the second divider position forms a part of the storage wall of the storage volume;
    two divider receptacles, which are spaced apart from one another, are arranged on the storage wall and on which a respective one of two longitudinal ends of the compartment divider is received, wherein the compartment divider on each of the divider receptacles is mounted rotatably about a divider axis of rotation which is perpendicular to a connecting axis between the divider receptacles, and
    a positioning device arranged on each of the divider receptacles, which positioning device is pretensioned to transfer the compartment divider into the second divider position via a rotational positioning force, and/or to retain the compartment divider at the second divider position, wherein
        the compartment divider is not wound around the positioning device via the positioning force.

2. The storage compartment according to claim 1, wherein the positioning device has a spring, which is pretensioned so as to transfer the compartment divider into the second divider position by way of a spring force and/or so as to retain the compartment divider at the second divider position.

3. The storage compartment according to claim 1, wherein the compartment divider has a respective receiving region laterally on either side of the central region, on the longitudinal end of which receiving region the compartment divider is received respectively in one of the divider receptacles.

4. The storage compartment according to claim 3, wherein the receiving regions have a macroscopically rigid form.

5. The storage compartment according to claim 3, wherein a respective bending axis is provided between the central region and each of the receiving regions of the compartment divider.

6. The storage compartment according to claim 5, wherein a respective rotary joint is arranged on the bending axis.

7. The storage compartment according to claim 5, wherein,
    as a result of a deflection of the central region about the bending axes, the compartment divider is transferrable from the second divider position into a third divider position, in which the central region subdivides the storage volume into a third subcompartment and a fourth subcompartment.

8. The storage compartment according to claim 5, wherein,
    as a result of a deflection of the receiving regions about the bending axes, the compartment divider is transferrable from the first divider position into the third divider position.

9. The storage compartment according to claim 1, wherein that part of the storage wall which is formed by the compartment divider has an at least substantially constant curvature, such that said part of the storage wall has an at least substantially constant radius.

10. The storage compartment according to claim 1, wherein
    the storage compartment on a far side of the compartment divider has a prismatic basic shape and the compartment divider is arranged on one corner of the basic shape.

11. The storage compartment according to claim 10, wherein
    the prismatic basic shape is substantially rectangular.

12. The storage compartment according to claim 1, wherein
    two compartment dividers which are spaced apart from one another are provided.

13. The storage compartment according to claim 12, wherein
    the two compartment dividers are formed mirror-symmetrically with respect to a center longitudinal axis of the storage compartment.

14. The storage compartment according to claim 1, wherein
    at least one protrusion is arranged in a region in which the compartment divider comprises the macroscopically elastic material and on a side facing a container to be retained.

* * * * *